US008127352B2

(12) United States Patent
Imamoto

(10) Patent No.: US 8,127,352 B2
(45) Date of Patent: Feb. 28, 2012

(54) INFORMATION PROCESSING SYSTEM, INFORMATION PROCESSING APPARATUS, INFORMATION PROCESSING METHOD, AND RECORDING MEDIUM

(75) Inventor: Yoshiharu Imamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 708 days.

(21) Appl. No.: 12/136,554

(22) Filed: Jun. 10, 2008

(65) Prior Publication Data

US 2008/0313702 A1 Dec. 18, 2008

(30) Foreign Application Priority Data

Jun. 13, 2007 (JP) ................................. 2007-156737
Jun. 2, 2008 (JP) ................................. 2008-144872

(51) Int. Cl.
*G06F 11/00* (2006.01)
*G06F 12/14* (2006.01)
*G06F 12/16* (2006.01)
*G08B 23/00* (2006.01)

(52) U.S. Cl. ........................................... 726/22

(58) Field of Classification Search ...................... 726/22
See application file for complete search history.

(56) References Cited

U.S. PATENT DOCUMENTS

2007/0064943 A1* 3/2007 Ginter et al. .................. 380/233
2008/0065548 A1* 3/2008 Muijen ........................... 705/51

FOREIGN PATENT DOCUMENTS

JP 3738020 B2 1/2006

OTHER PUBLICATIONS

Real-time multi-tasking in software synthesis for information processing systems; Authors: Filip Thoen; Marco Cornero; Gert Goossens; Hugo De Man. Published in ACM New York, NY, USA 1995; ISBN: 0-89791-771-5.*

* cited by examiner

*Primary Examiner* — Kambiz Zand
*Assistant Examiner* — Stephen Sanders
(74) *Attorney, Agent, or Firm* — Fitzpatrick, Cella, Harper & Scinto

(57) ABSTRACT

An information processing system which includes a compound content generation apparatus and a compound content consumption apparatus and processes a plurality of protected contents, the compound content generation apparatus comprising a compound content generation unit configured to generate a compound content from a plurality of protected contents, and the compound content consumption apparatus comprising a composite policy generation unit configured to generate a composite policy by obtaining an intersection of condition values of policies set for the respective protected contents contained in the compound content, and a compound content consumption unit configured to consume the compound content in accordance with the composite policy.

8 Claims, 14 Drawing Sheets

FIG. 2B

```
<Document>
<Paper size="A4"/>
<PageSet>
<Page no="1">
<Object><Position x="10" y="10"><Size height="20" width="20"><File>Logo.svg</File></Size></Position></Object>
<Object><Position x="10" y="50"><Size height="20" width="20"><File>Name1.ps</File></Size></Position></Object>
<Object><Position x="25" y="10"><Size height="50" width="15"><File>Face2.jpg</File></Size></Position></Object>
</Page>
<Page no="2">
<Object><Position x="10" y="10"><Size height="20" width="20"><File>Logo.svg</File></Size></Position></Object>
<Object><Position x="10" y="50"><Size height="20" width="35"><File>Name2.ps</File></Size></Position></Object>
<Object><Position x="25" y="10"><Size height="15" width="15"><File>Face2.jpg</File></Size></Position></Object>
</Page>
<Page no="3">
<Object><Position x="10" y="10"><Size height="20" width="35"><File>Name3.ps</File></Size></Position></Object>
<Object><Position x="10" y="50"><Size height="20" width="20"><File>Face3.jpg</File></Size></Position></Object>
<Object><Position x="25" y="50"><Size height="20" width="10"><File>Logo.svg</File></Size></Position></Object>
</Page>
</PageSet>
</Document>
```

212

Document.xml

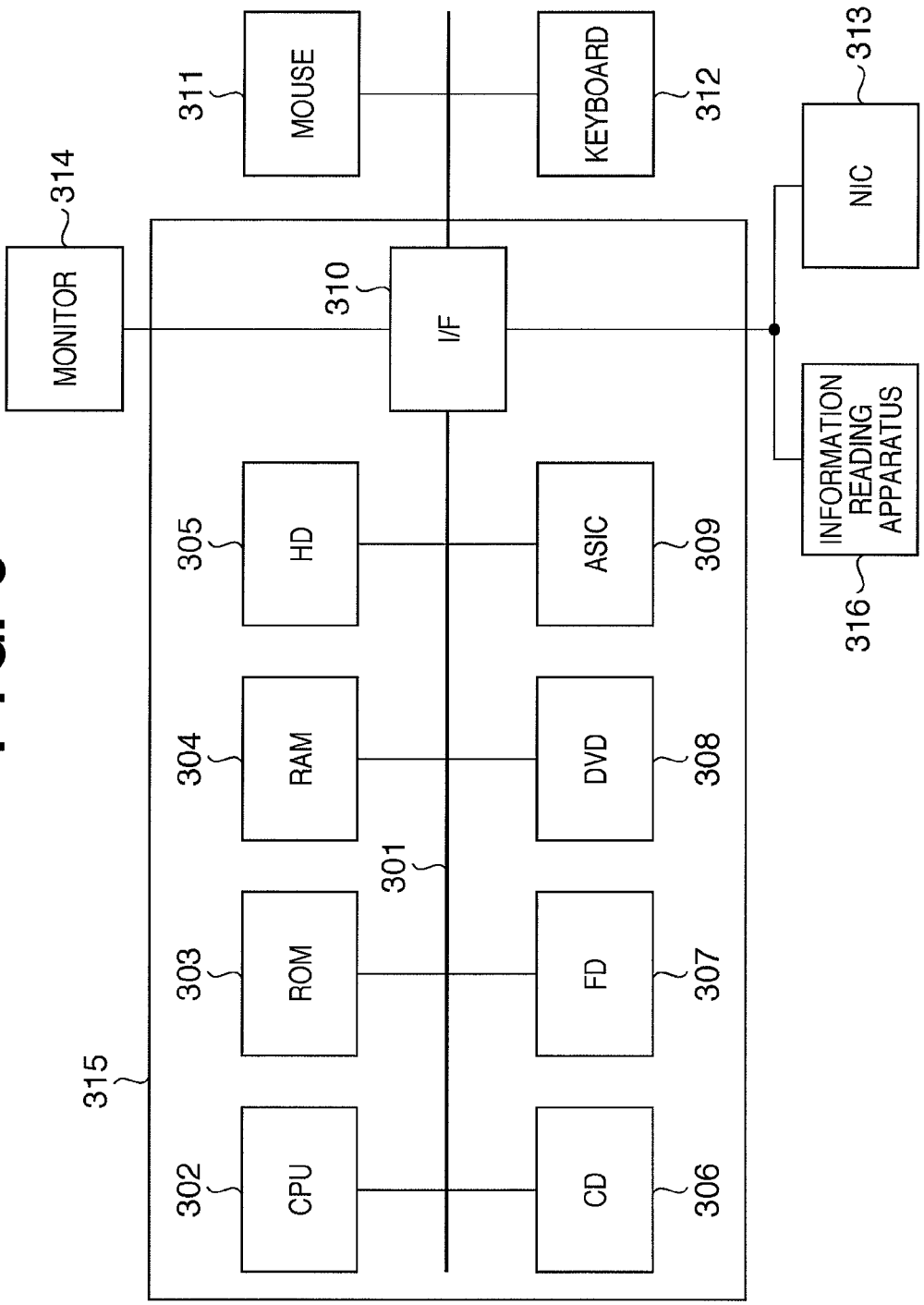

FIG. 8

```
<Policy ContentID ="ID_A">
  <Condition Type ="ValidTime">2006/10/01-2006/10/31</Condition>
  <Condition Type ="Action">View, Print</Condition>
</Policy>
```
~1301

```
<Policy ContentID ="ID_B">
  <Condition Type ="ValidTime">2006/01/01-2006/12/31</Condition>
  <Condition Type ="Action">Print</Condition>
</Policy>
```
~1302

```
<CompositePolicy Content ="ID_A,ID_B">
  <Condition Type ="ValidTime">2006/10/01-2006/10/31</Condition>
  <Condition Type ="Action">Print</Condition>
</CompositePolisy>
```
~1303

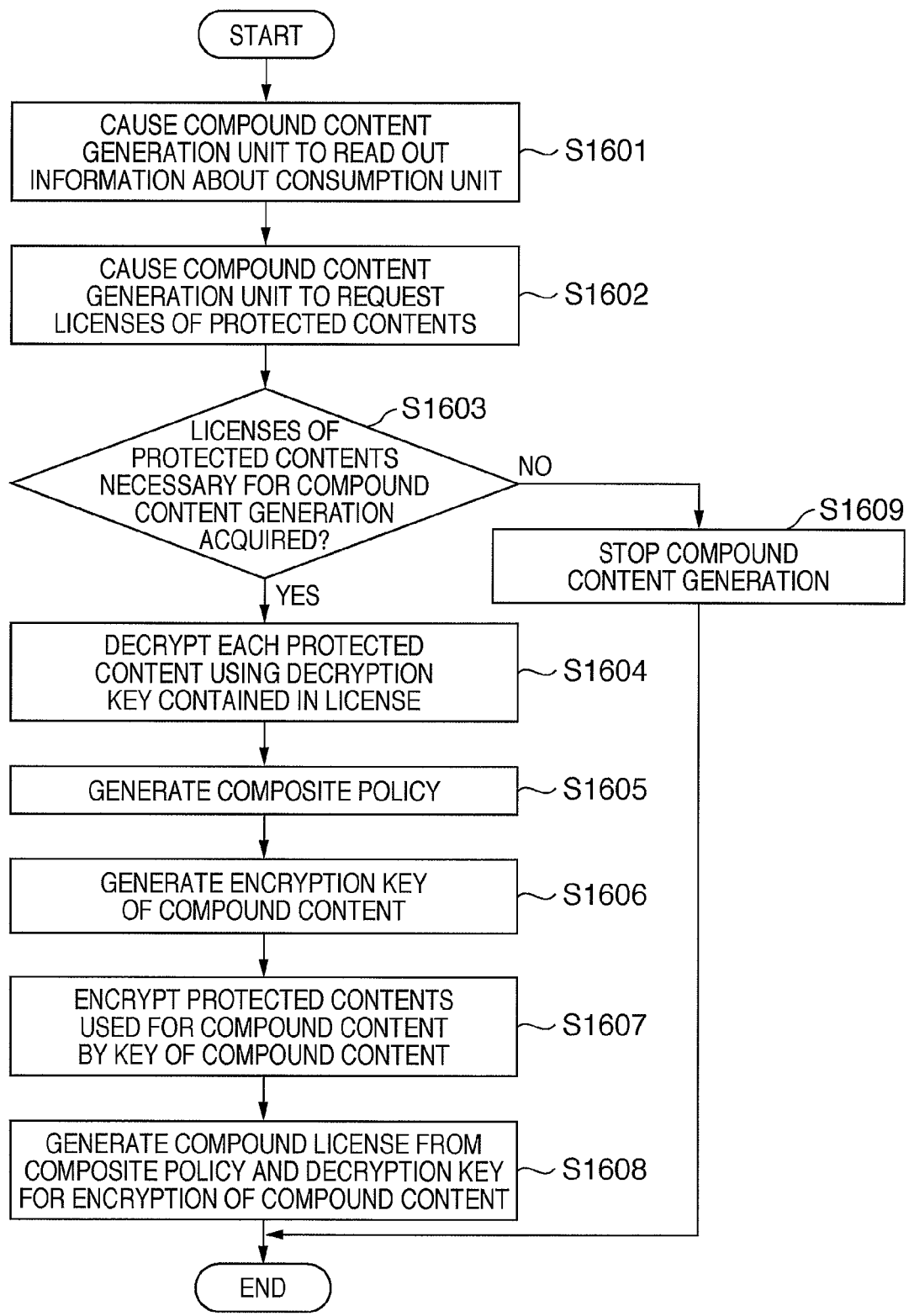

FIG. 12

```
<Policy ContentID ="ID_C">
  <Condition Type ="ValidTime" >2006/10/01-2006/10/31</Condition>
  <Condition Type ="Count" >5</Condition>
  <Condition Type ="Action" >View, Print</Condition>
</Policy>
```
~1701

```
<Policy ContentID ="ID_D">
  <Condition Type ="ValidTime">2006/01/01-2006/12/31</Condition>
  <Condition Type ="Action" >Print</Condition>
</Policy>
```
~1702

```
<CompositePolicy Content =" ID_C,ID_D">
  <Condition Type ="ValidTime" >2006/10/01-2006/10/31</Condition>
  <Condition Type ="Count" >5</Condition >
  <Condition Type ="Action" >Print</Condition>
</CompositePolicy >
```
~1703

FIG. 14

```
<Policy ContentID ="ID_E">
  <Condition Type ="ValidTime" >2006/10/01-2006/10/31</Condition>
  <Condition Type ="Count" >5</Condition>
  <Condition Type ="Action" >View, Print</Condition>
</Policy>
```
~1801

```
<Policy ContentID ="ID_F">
  <Condition Type ="ValidTime" >2006/01/01-2006/06/30</Condition>
  <Condition Type ="Count" >3</Condition>
  <Condition Type ="Action" >Print</Condition>
</Policy>
```
~1802

```
<CompositePolicy Content =" ID_E,ID_F">
  <Condition Type ="NotAvailable" />
</CompositePolicy >
```
~1803

INFORMATION PROCESSING SYSTEM, INFORMATION PROCESSING APPARATUS, INFORMATION PROCESSING METHOD, AND RECORDING MEDIUM

BACKGROUND OF THE INVENTION

1. Field of the Invention

The present invention relates to an information processing system, information processing apparatus, information processing method, and recording medium.

2. Description of the Related Art

Conventionally, a technique called DRM (Digital Rights Management) is used to manage the copyrights of contents represented by electronic data such as music, moving images, and still images. In the DRM technology, a policy that describes the usage condition of a content is set for each content. A content is usable only when its policy is satisfied.

An example of content management using the DRM technology will be described. In the following description, a content protected by the DRM technology will be referred to as a protected content, and a content that is not protected by the DRM technology will be referred to as a non-protected content.

First, a content copyright holder encrypts a content and generates a license containing a decryption key to decrypt the encrypted content and a policy that sets the usage condition of the content. The encrypted content which has meta-information to acquire the license is distributed as a protected content. A consumer who has received the protected content requests the license using the meta-information attached to the protected content. The content copyright holder issues the license to only authenticated users or users who have paid for the content. Upon acquiring the license, the consumer uses the decryption key contained in the license in accordance with the policy and consumes the content.

Consumption of a content indicates processing the data of an image or a moving image and outputting it to a screen or as a printed product, or copying or editing the content. Policy evaluation to be described later indicates a process of checking whether an environment (use time or user) in using a protected content satisfies a condition described in a policy and determining whether to allow consumption of the protected content.

As another application example of the DRM technology, content distribution is restricted only on terminals and a dedicated network represented by, for example, a portable phone network. This enables to restrict use of contents on the terminals in accordance with a policy set for each content.

Normally, the DRM technology is often used to protect the copyright of a single content. Japanese Patent No. 03738020 proposes a system for protecting the copyright of a compound content including a plurality of contents.

According to this technique, a compound content includes a plurality of protected contents and has a description structure. The description structure is data which represents the relationship between the policies of the protected contents included in the compound content and aims at controlling consumption of the compound content. The description structure describes information such as "designated consumption is permitted when the policies of all protected contents are satisfied", or "designated consumption is permitted when the policy of at least one protected content is satisfied". When consuming a compound content, the policies of protected contents included in it are evaluated so that consumption of the compound content is controlled based on the evaluation results and the description structure.

According to the above-described conventional DRM technology, however, in consuming a compound content, it is necessary to evaluate the policies of protected contents included in it. This poses the following problems.

When repetitive consumption of the compound content is necessary, the policies of the protected contents are repeatedly evaluated, resulting in inefficiency. For example, to print the compound content or output it to a screen, the policies of the protected contents included in the compound content are evaluated one by one each time.

If it is necessary, in consuming the compound content, to consume all protected contents included in it, whether to allow use of the compound content cannot be determined until evaluation of the policies of all protected contents finishes. For this reason, a user who has requested consumption of the compound content must wait for the end of policy evaluation of all protected contents to obtain the consumption result (obtain an output to a screen).

These problems become more conspicuous as the number of protected contents included in a compound content increases.

SUMMARY OF THE INVENTION

The present invention provides an information processing system which determines in a shorter time whether to allow consumption of a compound content including a plurality of protected contents.

According to one aspect of the present invention, there is provided an information processing system which includes a compound content generation apparatus and a compound content consumption apparatus and processes a plurality of protected contents, the compound content generation apparatus comprising a compound content generation unit configured to generate a compound content from a plurality of protected contents, and the compound content consumption apparatus comprising a composite policy generation unit configured to generate a composite policy by obtaining an intersection of condition values of policies set for the respective protected contents contained in the compound content, and a compound content consumption unit configured to consume the compound content in accordance with the composite policy.

According to another aspect of the present invention, there is provided an information processing system including a compound content generation apparatus and a compound content consumption apparatus, the compound content generation apparatus comprising a compound content generation unit configured to generate a compound content from a plurality of protected contents, and a composite policy generation unit configured to generate a composite policy by obtaining an intersection of condition values of policies set for the respective protected contents contained in the compound content, and the compound content consumption apparatus comprising a compound content consumption unit configured to consume the compound content in accordance with the composite policy.

According to still another aspect of the present invention, there is provided an information processing apparatus for processing a plurality of protected contents, comprising a compound content generation unit configured to generate a compound content from the plurality of protected contents, a composite policy generation unit configured to generate a composite policy by obtaining an intersection of condition values of policies set for the respective protected contents contained in the compound content, and a compound content consumption unit configured to consume the compound content in accordance with the composite policy.

According to yet another aspect of the present invention, there is provided an information processing method of processing a plurality of protected contents, comprising steps of causing a compound content generation unit to generate a compound content from the plurality of protected contents, causing a composite policy generation unit to generate a composite policy by obtaining an intersection of condition values of policies set for the respective protected contents contained in the compound content, and causing a compound content consumption unit to consume the compound content in accordance with the composite policy.

According to still yet another aspect of the present invention, there is provided a computer-readable recording medium recording a computer program which is executed on a computer to cause the computer to function as the above information processing apparatus.

Further features of the present invention will become apparent from the following description of exemplary embodiments with reference to the attached drawings.

BRIEF DESCRIPTION OF THE DRAWINGS

FIG. 2B is a view showing an example of a compound content according to the embodiment.

FIG. 3 is a block diagram showing the arrangement of a host computer applicable to each apparatus according to the embodiment.

FIG. 8 is a view showing an example of a composite policy generation process according to the embodiment.

FIG. 11 is a flowchart illustrating a compound content generation process according to the second embodiment.

FIG. 12 is a view showing an example of composite policy generation according to the second embodiment.

FIG. 14 is a view showing an example of composite policy generation according to the embodiment.

DESCRIPTION OF THE EMBODIMENTS

The present invention will now be described in detail with reference to the accompanying drawings by exemplifying preferred embodiments. The arrangements to be described in the following embodiments are merely examples, and the present invention is not limited to the illustrated arrangements.

The embodiments will be described using a DRM system which protects a protected content by encryption and requires a license containing a key to decrypt the encrypted content for consumption of the protected content. However, the present invention is not limited to this example and is applicable to any system for restricting content use by a policy.

According to the present invention, a policy is expressed by combining a plurality of conditions. Each condition is described by a condition item and a condition value. The condition item is checked in content use control. The condition value serves as a reference of determination in the check. For example, when the condition item is "user who is allowed to use", a value to identify a user A or a user B is set as the condition value. Other examples of the condition item are "content use period", "use count", and "location of use".

FIG. 8 shows an example of a policy that is described in XML. Referring to FIG. 8, a "Policy" tag indicates a policy. A "ContentID" attribute indicates the identifier of an object whose consumption is controlled by the policy. A "Condition" tag indicates a condition. A "Type" attribute indicates the above-described condition item, whose element contents represent the above-described condition value. A condition item designated by "Valid_Time" represents a use period. A condition item designated by "Action" represents a type of consumption permitted for the content. More specifically, a policy 1301 indicates that browsing and printing of a content designated by ID_A are permitted during a period from Oct. 10, 2006 to Dec. 31, 2006.

First Embodiment

Outline of System

Figure 1:
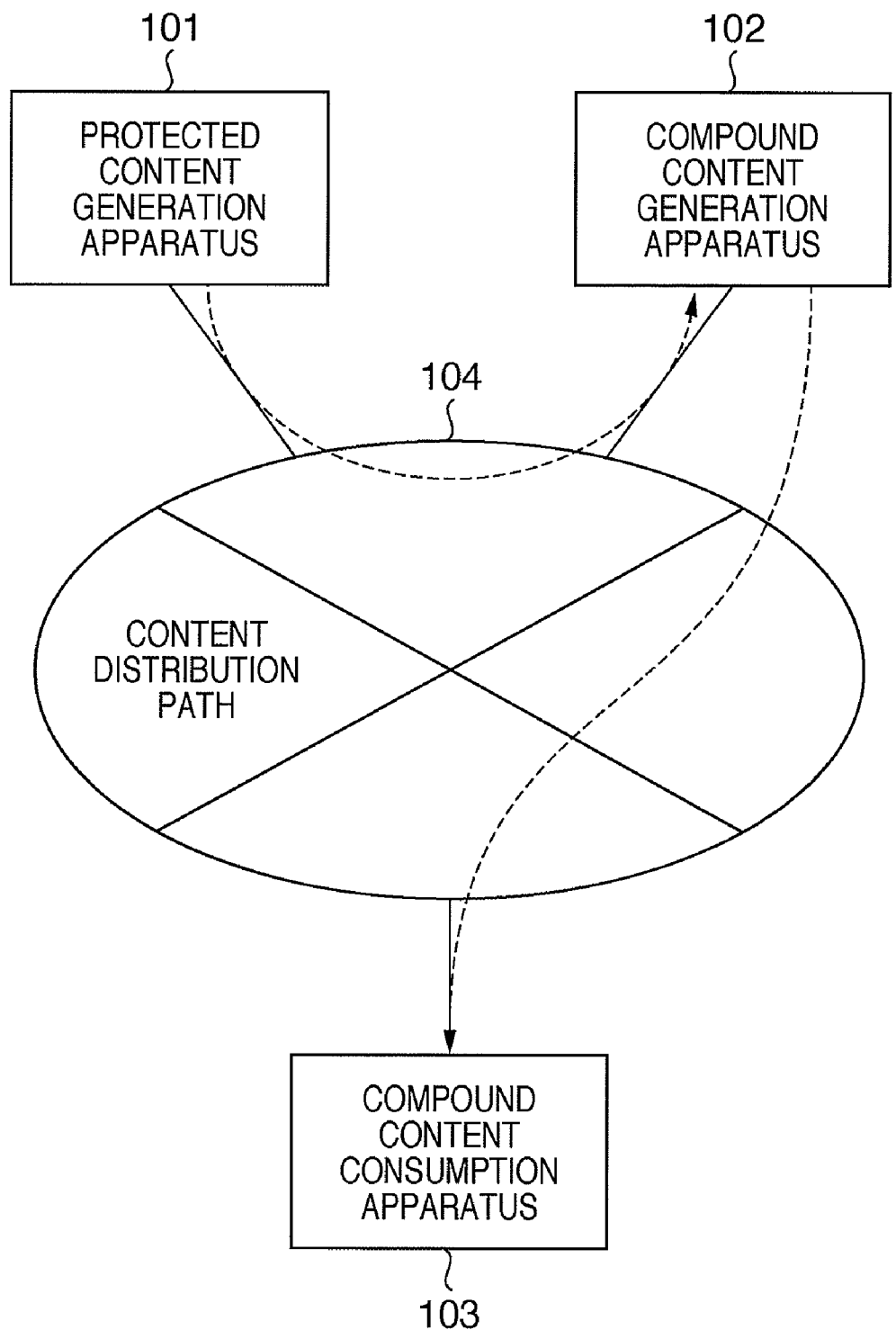
FIG. 1 is a block diagram showing the schematic arrangement of a system according to an embodiment of the present invention.

FIG. 1 shows the outline of a system according to this embodiment. Referring to FIG. 1, a protected content generation apparatus 101, compound content generation apparatus 102, and compound content consumption apparatus 103 exchange electronic data via a content distribution path 104.

In this embodiment, a content indicates electronic data that is the digital information of a text, document, image, video image, or the like. The following description will be made assuming, as the content distribution path 104, a distribution path via a computer network represented by the Internet. However, the present invention is not limited to this. The content distribution path 104 also includes, for example, a dedicated network formed from dedicated devices such as portable phones and a physical distribution path which distributes recording media such as a CD-ROM and a DVD-ROM.

The protected content generation apparatus 101, compound content generation apparatus 102, and compound content consumption apparatus 103 need not always directly exchange data, as shown in FIG. 1. They may be connected via other apparatuses. Alternatively, the content distribution path 104 which connects the protected content generation apparatus 101 to the compound content generation apparatus 102 and the content distribution path 104 which connects the compound content generation apparatus 102 to the compound content consumption apparatus 103 may have different forms.

The protected content generation apparatus 101 generates a protected content whose use is restricted by a policy. Use of a protected content is restricted by, for example, managing a key to decrypt an encrypted protected content, or using a device represented by a portable phone which restricts user access.

The compound content generation apparatus 102 generates a compound content using a plurality of protected contents generated by the protected content generation apparatus 101. In the example shown in FIG. 1, the protected content generation apparatus 101 and the compound content generation apparatus 102 are connected in a one-to-one correspondence. However, the present invention is not limited to this arrangement. The compound content generation apparatus 102 can also receive protected contents from a plurality of protected content generation apparatuses 101. Details of a compound content will be described later.

The compound content consumption apparatus 103 consumes the compound content generated by the compound content generation apparatus 102. In consuming the compound content, whether to allow consumption is determined based on a composite policy to be described later.

Structure of Compound Content

The compound content according to this embodiment will be described. The compound content of this embodiment is generated by combining a plurality of protected contents and/or non-protected contents (both will be simply referred to as objects hereinafter without discrimination). The compound content is described by the objects and their configuration information.

The configuration information represents how to arrange objects to generate a compound content. For example, if a compound content is document data, the configuration information includes information for designating an object such as an image or a text by a size or coordinates and information for designating a page configuration. If a compound content is moving image data, the configuration information represents the timing of displaying an object such as an image, moving image, or audio data.

The objects may be held either outside the compound content or inside it. When the objects are held outside the compound content, the position of each object is designated using reference information represented by a URL.

Figure 2A:
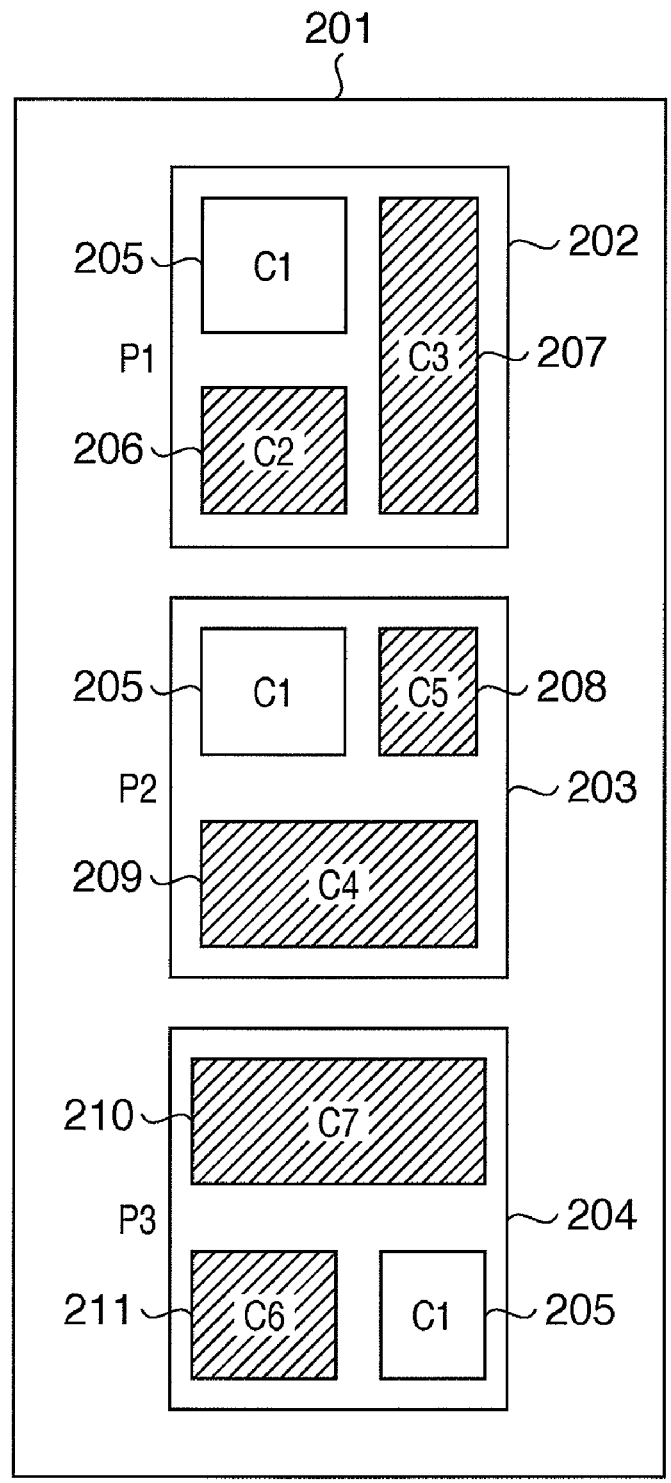
FIG. 2A is a view showing an example of a compound content according to the embodiment.

FIG. 2A is a view showing an example of the structure of a compound content. Referring to FIG. 2A, a document 201 is formed from a plurality of protected contents and includes pages P1, P2, and P3 indicated by 202, 203, and 204. The pages include contents 205 to 211. Note that the contents include protected contents and non-protected contents. In FIG. 2A, a content C1 (205) is a non-protected content, and the remaining contents represented by hatching are protected contents.

For example, the page P1 (202) includes the non-protected content C1 (205), a protected content C2 (206), and a protected content C3 (207). To print the page P1 (202), it is necessary to evaluate policies set for the protected contents C2 and C3.

To print each page of the document 201, whether the pages P1 to P3 are printable is determined by evaluating the policies of the protected contents included in the respective pages. Then, whether each page of the document 201 is printable is determined based on the policy evaluation result of each page. To print the document 201 as one document, whether the document 201 is printable is determined by evaluating the policies of all protected contents included in the document 201.

A description example of a compound content will be described next with reference to FIG. 2B. Referring to FIG. 2B, reference numeral 212 denotes an example in which the compound content having the configuration of the document 201 in FIG. 2A is described in XML. In the reference numeral 212, "Page" tags describe the pages 202, 203, and 204 in the document 201 that is a compound content. "Object" tags describe the contents 205 to 211 in the document 201 that is a compound content.

The "Page" tag defines a page of the document. An object included in the page is designated by describing an "Object" tag in the "Page" tag. A "File" tag in the "Object" tag designates information for identifying the object. A "Position" tag and a "Size" tag designate the position to render the object in the page. A "Paper" tag designates the page size of the document.

A process according to this embodiment will be described below using the document 201 shown in FIG. 2A as an example of the compound content. However, the process target of the present invention is not limited to document data. The present invention is applicable to arbitrary data such as still image data, moving image data, or music data.

Arrangement of Host Computer

A host computer applicable to the embodiment will be described next. FIG. 3 is a block diagram showing the basic arrangement of a host computer which functions as the protected content generation apparatus 101, compound content generation apparatus 102, and compound content consumption apparatus 103 of this embodiment and the relationship with respect to peripheral devices.

Referring to FIG. 3, a host computer 315 is, for example, a popular personal computer. The host computer 315 can store data in a hard disk (HD) 305, CD, FD, and DVD or display stored data on a monitor 314. The host computer 315 can also transmit or receive electronic data via, for example, the Internet using a NIC 313. A user inputs various instructions from a mouse 311 or a keyboard 312. The monitor 314 can display various kinds of information from the host computer 315.

In the host computer 315, blocks to be described below are connected via a bus 301 to exchange various kinds of data. A CPU 302 can control the operations of the units in the host computer 315 or execute a program loaded in a RAM 304. A ROM 303 stores a BIOS and boot programs. The RAM 304 temporarily stores a program or process target image data to be processed by the CPU 302. The OS or a program used by the CPU 302 for various kinds of processes to be described later is loaded in the RAM 304.

The HD 305 is used to store the OS or a program to be transferred to the RAM 304 or the like, or used by the apparatus to store or read out image data during an operation. A CD-ROM drive 306 can read out data from a CD-ROM (CD-R) that is an external storage medium, or write data in it.

An FD drive 307 can read out data from an FD (Floppy® disk) or write data in it, like the CD-ROM drive 306. A DVD-ROM (DVD-RAM) drive 308 can also read out data from a DVD-ROM or write data in a DVD-RAM, like the CD-ROM drive 306. When a CD-ROM, FD, or DVD-ROM stores an image processing program, the program is installed in the HD 305 and then transferred to the RAM 304, as needed.

An interface (I/F) 310 connects the host computer 315 to various peripheral devices. The mouse 311 and the keyboard 312 are connected to the host computer 315 via the I/F 310 so that various instructions input from the mouse 311 or the keyboard 312 are input to the CPU 302 via the I/F 310.

An ASIC 309 quickly processes data, which should be processed in the host computer 315, in place of the CPU 302. For example, the ASIC 309 executes an encryption process or a RIP process at a high speed in place of the CPU 302, although these processes are executable even by the CPU 302.

An information reading apparatus 316 reads digital data outside the host computer 315. The information reading apparatus 316 includes, for example, a scanner apparatus or an apparatus for reading an SD card, a Compact Flash® card, or the like.

Arrangement of Protected Content Generation Apparatus

The internal arrangement of the protected content generation apparatus 101 according to this embodiment will now be described with reference to FIG. 4. As described above, the protected content generation apparatus 101 of this embodiment is implemented by causing the host computer 315 shown in FIG. 3 to execute a protected content generation program.

Figure 4:
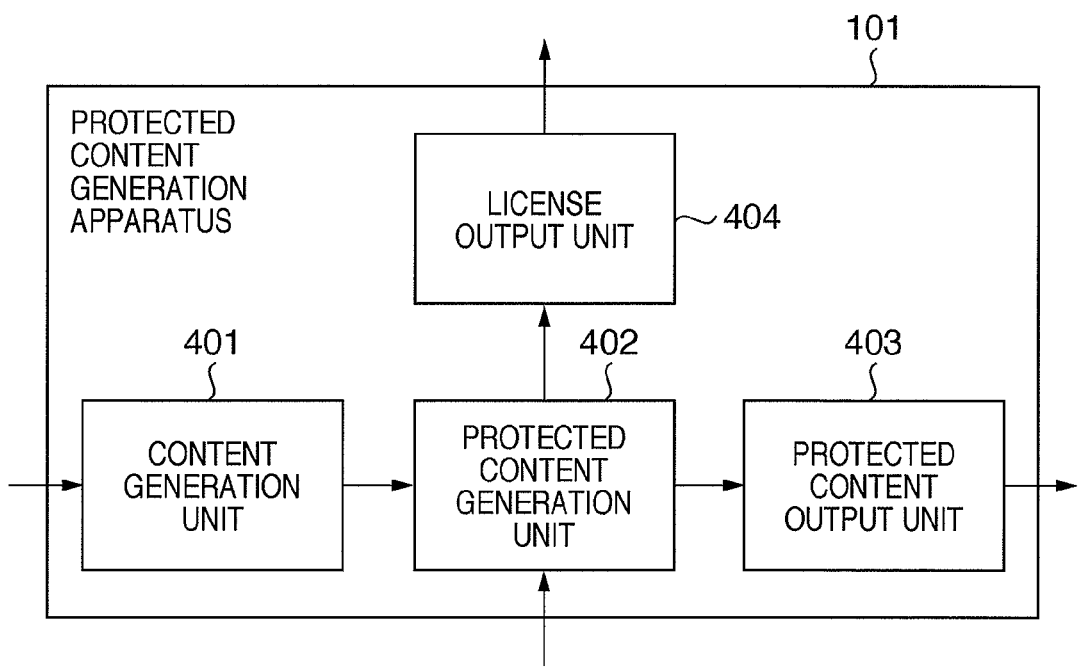
FIG. 4 is a block diagram showing the arrangement of a protected content generation apparatus according to the embodiment.

As shown in FIG. 4, the protected content generation apparatus 101 of this embodiment includes a content generation unit 401, protected content generation unit 402, protected content output unit 403, and license output unit 404.

The operator operates the mouse 311 or the keyboard 312 so that the protected content generation unit 402 sets a policy for a content generated by the content generation unit 401. The protected content generation unit 402 outputs a generated protected content to the protected content output unit 403. The protected content generation unit 402 also outputs, to the license output unit 404, a license necessary for consumption of the protected content. In this embodiment, a license indicates information containing key information necessary for consumption of a protected content and a policy that describes a protected content usage condition.

The protected content generation unit 402 encrypts a received content and attaches meta-information necessary for license acquisition. The protected content generation unit 402 describes, in a license, a policy and a decryption key corresponding to an encryption key used for encryption and outputs the generated license to the license output unit 404.

The protected content output unit 403 outputs the protected content generated by the protected content generation unit 402 in a form distributable through the content distribution path 104. The protected content output from the protected content output unit 403 can be either output via the NIC 313 connected to the host computer 315 or recorded on a recording medium represented by a CD-R or a DVD-R.

The license output unit 404 outputs the license information received from the protected content generation unit 402 in a form to ensure safe management. For example, the license is encrypted so that only a user or an apparatus that has acquired the license can decrypt it, or transmitted to an apparatus which safely manages the license. Alternatively, the license is written in an area of a DVD-ROM that is not read-accessible from a normal apparatus.

Arrangement of Compound Content Generation Apparatus

The internal arrangement of the compound content generation apparatus 102 according to this embodiment will now be described with reference to FIG. 5. As described above, the compound content generation apparatus 102 of this embodiment is implemented by causing the host computer 315 shown in FIG. 3 to execute a compound content generation program. An example of the program is general document creation software.

Figure 5:
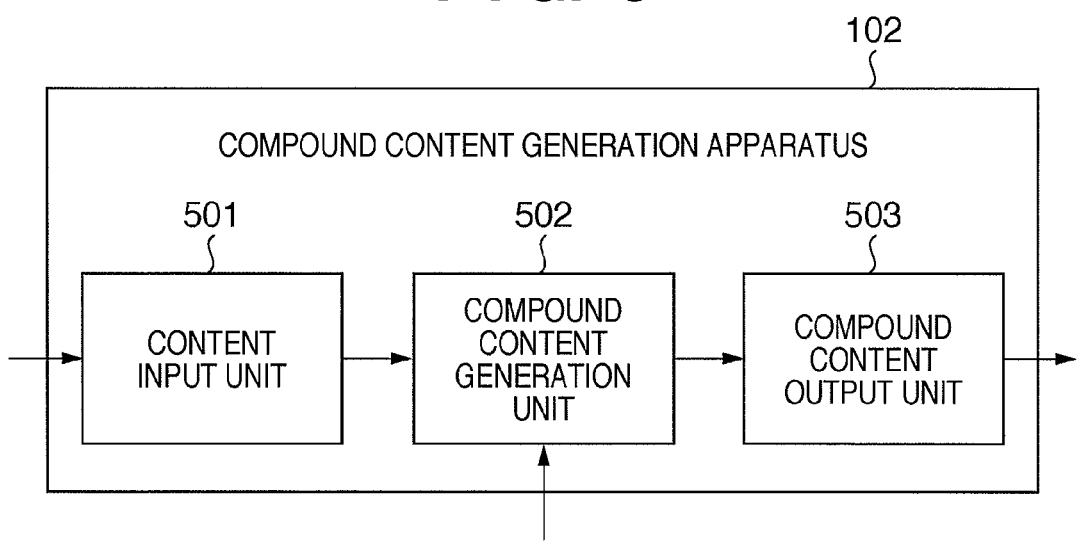
FIG. 5 is a block diagram showing the arrangement of a compound content generation apparatus according to the embodiment.

As shown in FIG. 5, the compound content generation apparatus 102 of this embodiment includes a content input unit 501, compound content generation unit 502, and compound content output unit 503.

The content input unit 501 loads objects to the compound content generation apparatus 102 via the NIC 313, CD-ROM drive 306, or DVD drive 308. The objects loaded by the content input unit 501 include the protected content generated by the protected content generation apparatus 101.

The operator arranges, using the mouse 311 or the keyboard 312, the contents received by the content input unit 501 on pages so that the compound content generation unit 502 generates a compound content. The generated compound content is output to the compound content output unit 503.

The compound content output unit 503 outputs the compound content generated by the compound content generation unit 502 in a form distributable through the content distribution path 104. The compound content output from the compound content output unit 503 can be either output via the NIC 313 connected to the host computer 315 or recorded on a recording medium represented by a CD-R or a DVD-R.

In this example, only objects are input to the compound content generation apparatus 102. However, the present invention is not limited to this. A compound content generated in advance may be input to the compound content generation apparatus 102 again. When a compound content is input, the compound content generation apparatus 102 can edit the compound content by changing configuration information contained in the input compound content or executing, for example, change, addition, or deletion of an object in the compound content.

Arrangement of Compound Content Consumption Apparatus

The internal arrangement of the compound content consumption apparatus 103 according to this embodiment will now be described with reference to FIG. 6. As described above, the compound content consumption apparatus 103 of this embodiment is implemented by causing the host computer 315 shown in FIG. 3 to execute a compound content consumption program.

Figure 6:
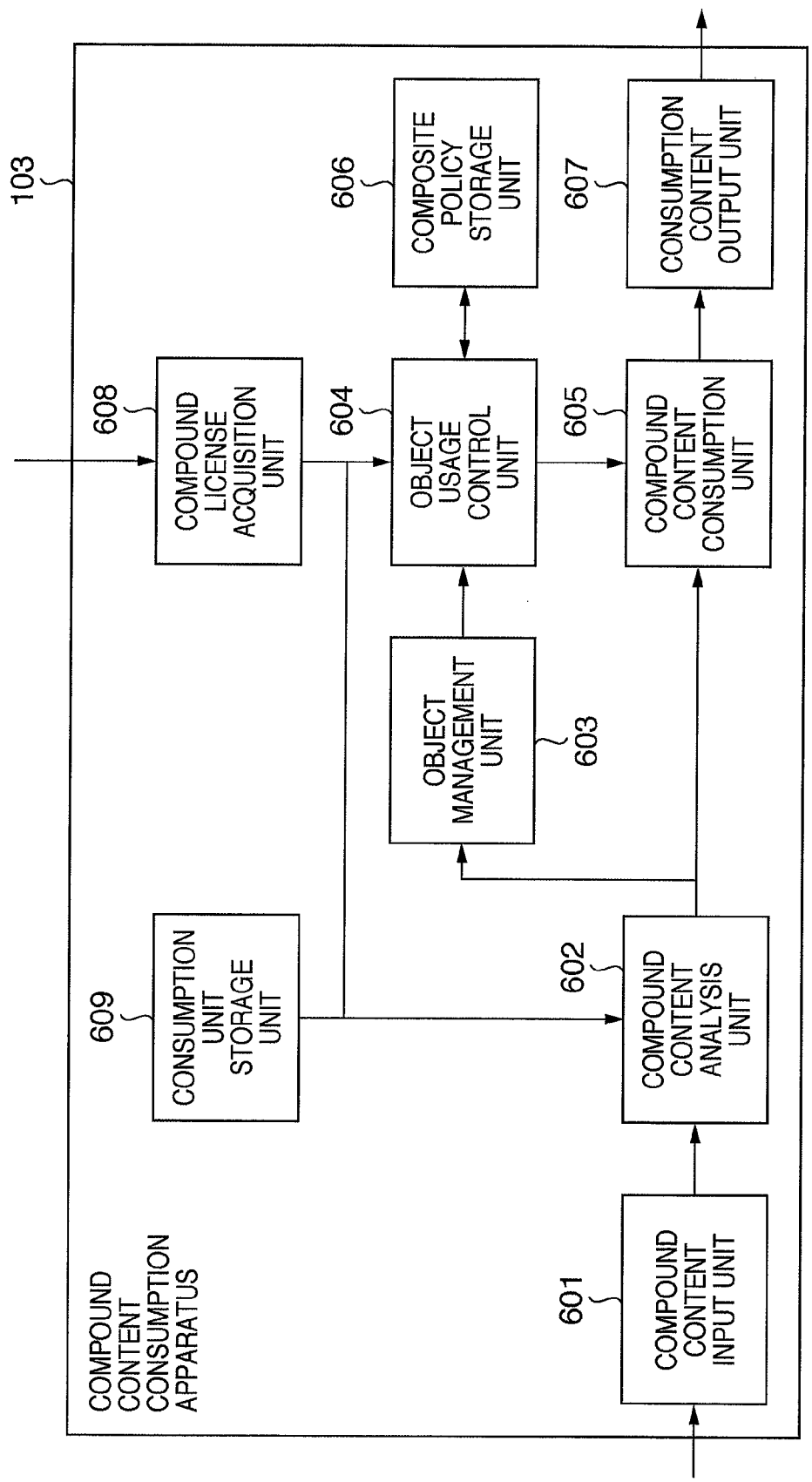
FIG. 6 is a block diagram showing the arrangement of a compound content consumption apparatus according to the embodiment.

As shown in FIG. 6, the compound content consumption apparatus 103 of this embodiment includes a compound content input unit 601, compound content analysis unit 602, object management unit 603, and object usage control unit 604. The compound content consumption apparatus 103 also includes a compound content consumption unit 605, composite policy storage unit 606, consumption content output unit 607, compound license acquisition unit 608, and consumption unit storage unit 609.

The compound content input unit 601 loads the compound content generated by the compound content generation apparatus 102 to the compound content consumption apparatus 103 via the NIC 313, CD-ROM drive 306, or DVD drive 308.

The compound content analysis unit 602 analyzes the compound content input by the compound content input unit 601, thereby extracting configuration information and identification information such as an object identifier. The pieces of extracted object identification information are sent to the object management unit 603. The pieces of configuration information are sent to the compound content consumption unit 605. If the compound content contains an object, the compound content analysis unit 602 extracts the object and sends it to the object management unit 603.

The object management unit 603 receives the object identification information sent from the compound content analysis unit 602 and, in response to a request from the object usage control unit 604, returns an object to the object usage control unit 604. If an object necessary for consumption of the compound content is held outside the compound content consumption apparatus 103, the object is acquired outside the compound content consumption apparatus 103 using reference information.

If the object identification information received from the object management unit 603 indicates a non-protected content, the object usage control unit 604 returns the object in response to a request from the compound content consumption unit 605. On the other hand, if the object identification information indicates a protected content, the object usage control unit 604 requests the license acquisition unit 608 to acquire the license using meta-information attached to the protected content. If the license could be acquired, the object usage control unit 604 controls usage of the protected content in accordance with the policy contained in the license. If the license could not be acquired, the object usage control unit 604 stops protected content consumption and notifies the compound content consumption unit 605 of it. In this way, the object usage control unit 604 acquires the license of each protected content and then generates a composite policy contained in the licenses. The composite policy generation process will be described later in detail.

The compound license acquisition unit 608 acquires the license output from the license output unit 404 of the protected content generation apparatus 101 using the meta-information of the protected content received from the object usage control unit 604 and transfers the license to the object usage control unit 604.

The consumption unit storage unit 609 stores information about a consumption unit of a plurality of objects. Examples of object consumption units are "page by page", "page group by page group", and "document by document". Assume that the object consumption unit is "page by page". In this case, when all objects necessary for constituting one page are consumable, the objects are consumed. Assume that the object consumption unit is "page group by page group". In this case, when all objects necessary for constituting five to 10 pages are consumable, the objects are consumed. Assume that the object consumption unit is "document by document". In this case, when all objects in a document are consumable, the objects are consumed. Note that the information about the consumption unit held by the consumption unit storage unit 609 can be either a value predetermined in the compound content consumption apparatus or a value set by the user.

The compound content consumption unit 605 acquires the information about the object consumption unit from the consumption unit storage unit 609. The compound content consumption unit 605 also requests the information about the consumption unit and the pieces of identification information of objects necessary for consumption of the compound content of the object usage control unit 604. Upon receiving the objects from the object usage control unit 604, the compound content consumption unit 605 consumes them in the compound content in accordance with its configuration information. If no object is acquired from the object usage control unit 604, the compound content consumption unit 605 stops consumption of the compound content or consumes the compound content using only acquired objects. The compound content consumption unit 605 cannot acquire an object from the object usage control unit 604 when, for example, access to a protected content is inhibited by policy evaluation, or the compound license acquisition unit 608 cannot acquire the license of the protected content.

The composite policy storage unit 606 stores a composite policy generated by the object usage control unit 604.

The consumption content output unit 607 outputs a compound content consumption result by the compound content consumption unit 605. For example, if the compound content is document data, the consumption content output unit 607 outputs it to the screen or prints it on a paper medium. If the compound content is a moving image or music, the consumption content output unit 607 outputs it to the screen and/or outputs audio data.

The object management unit 603, object usage control unit 604, compound content consumption unit 605, composite policy storage unit 606, and consumption content output unit 607 preferably have a tamper resistance. That is, it is necessary to prevent unauthorized readout of data handled by each processing unit or unauthorized change of a process assumed in advance.

Composite Policy Generation Process (Compound Content Generation Process)

The composite policy generation process according to this embodiment will now be described in detail. In the composite policy generation process of this embodiment, the condition items and condition values of a plurality of policies which are set for protected contents included in a compound content are optimized together, thereby generating a composite policy. The composite policy generation process is executed by the object usage control unit 604. Access to the protected contents used for composite policy generation is controlled by evaluating the generated composite policy.

A composite policy includes information for identifying a set of protected contents to be controlled by the composite policy and a policy to control access to the set of the protected contents. As the condition item of the composite policy, the condition items designated for the policies (to be referred to as partial policies hereinafter) used for composite policy generation are set. As the condition value of each condition item of the composite policy, a value corresponding to the intersection of the condition values set for the condition items of the respective partial policies is set.

Obtaining the intersection of condition values indicates a process of calculating a value common to the respective condition values. For example, when the condition item of a partial policy designates "allowable use count", the minimum one of the "counts" as the condition values of all partial policies is the intersection of the condition values. When the condition item of a partial policy designates "allowable use period", a period commonly included in the "periods" as the condition values of all partial policies is the intersection of the condition values. If no value that satisfies the condition values of all partial policies is obtained as the intersection of condition values, a value representing "unavailable" is set as the condition value of the composite policy.

An example of the composite policy generation process according to this embodiment will be described below with reference to FIG. 8. Referring to FIG. 8, the partial policy 1301 and a partial policy 1302 indicate the policies of protected contents whose identifiers are ID_A and ID_B, respectively. A composite policy 1303 is generated as a result of generating a composite policy from the partial policies 1301 and 1302.

In the example shown in FIG. 8, for the protected content ID_A, "screen output (View) and print output (Print) are permitted", as indicated by the "Action" attribute value, "during the period from Oct. 1, 2006 to Oct. 31, 2006" indicated by the "Valid_Time" attribute value. For the protected content ID_B, "print output (Print) is permitted", as indicated by the "Action" attribute value, "during the period from Jan. 1, 2006 to Dec. 31, 2006" indicated by the "Valid_Time" attribute value. A composite policy is generated from these partial policies. In this case, the composite policy 1303 is generated such that "print output (which is the common action) is permitted" "during the period from Oct. 1, 2006 to Oct. 31, 2006 (which is the common period)".

The object usage control unit 604 evaluates the composite policy 1303 generated in this way and determines whether the protected content ID_A and the protected content ID_B can be consumed simultaneously.

If the condition value of the condition item set for a partial policy indicates a condition such as "allowable use count"

that is updated every time the protected content is consumed, the condition value of the partial policy is preferably updated in generating the composite policy. Alternatively, when the protected content is consumed based on evaluation of the composite policy, the condition value of the consumed protected content is updated.

Assume that a policy A of a protected content A describes "user: Yamada; available process: print", and a policy B of a protected content B describes "user: Suzuki, Sato; available process: print". In this case, no user satisfies the conditions of the two policies. Hence, the composite policy is "unavailable".

An example in which the composite policy generation result becomes "unavailable" will be described with reference to FIG. 14. Referring to FIG. 14, partial policies 1801 and 1802 indicate the policies of protected contents whose identifiers are ID_E and ID_F, respectively. A composite policy 1803 is generated as a result of generating a composite policy from the partial policies 1801 and 1802. In the example shown in FIG. 14, the protected content ID_E is set such that "screen output (View) and print output (Print) are permitted", as indicated by the "Action" attribute value, "up to five times" indicated by the "Count" attribute value "during the period from Oct. 1, 2006 to Oct. 31, 2006" indicated by the "Valid_Time" attribute value. The protected content ID_F is set such that "print output (Print) is permitted", as indicated by the "Action" attribute value, "up to five times" indicated by the "Count" attribute value "during the period from Jan. 1, 2006 to Jun. 30, 2006" indicated by the "Valid_Time" attribute value. A composite policy is generated from these partial policies. In this case, no term of validity satisfies the condition values of the terms of validity (ValidTime) set for the two policies. Consequently, when a composite policy is generated from these partial policies, an "unavailable" composite policy is generated, as indicated by "NotAvailable" of the "Type" attribute.

An example has been described above, in which the all condition items are included in each of the partial policy. However, the present invention is not limited to this and is also applicable to a case in which the partial policies have no common condition item. In this case, the composite policy generation process is executed assuming that a condition value "unrestricted" is set for the condition item which is not set for a partial policy used for composite policy generation. Assume that a composite policy is generated from a partial policy A which sets "use count: 10" and a partial policy B which sets "use period: Oct. 1, 2006 to Oct. 21, 2006". In this case, the composite policy generation process is executed assuming that the partial policy A sets "use count: 10; use period: unrestricted", and the partial policy B sets "use count: unrestricted; use period: Oct. 10, 2006 to Oct. 21, 2006".

An example in which a composite policy is generated from partial policies having no common condition item will be described with reference to FIG. 12. Referring to FIG. 12, partial policies 1701 and 1702 indicate the policies of protected contents whose identifiers are ID_C and ID_D, respectively. A composite policy 1703 is generated as a result of generating a composite policy from the partial policies 1701 and 1702. In the example shown in FIG. 12, the protected content ID_C is set such that "screen output (View) and print output (Print) are permitted", as indicated by the "Action" attribute value, "up to five times" indicated by the "Count" attribute value "during the period from Oct. 1, 2006 to Oct. 31, 2006" indicated by the "Valid_Time" attribute value. The protected content ID_D is set such that "print output (Print) is permitted", as indicated by the "Action" attribute value "during the period from Jan. 1, 2006 to Dec. 31, 2006" indicated by the "Valid_Time" attribute value. The composite policy 1703 is generated by generating a composite policy from these partial policies. Concerning consumption of the protected contents ID_C and ID_D, the composite policy 1703 describes that "consumption is possible up to five times" and "print output (Print) (which is the common action) is permitted" "during the period from Oct. 1, 2006 to Oct. 31, 2006 (which is the common period)".

Another example will be described. For example, the policy A of the protected content A describes "user: Suzuki, Sato, Yamada; use period: Oct. 1, 2006 to Oct. 21, 2006; available process: print; use count: 3". On the other hand, the policy B of the protected content B describes "user: Suzuki, Sato; use period: Jan. 1, 2006 to Dec. 31, 2006; available process: print". In this case, "user: Suzuki, Sato; use period: Oct. 1, 2006 to Oct. 21, 2006; available process: print; use count: 3" is set as the contents of the composite policy to be evaluated for simultaneous consumption of the protected contents A and B. At this time, for the condition item "use count", the condition value of the policy B is assumed to be "unrestricted", as described above, in generating the composite policy.

Compound Content Consumption Process

Figure 7:
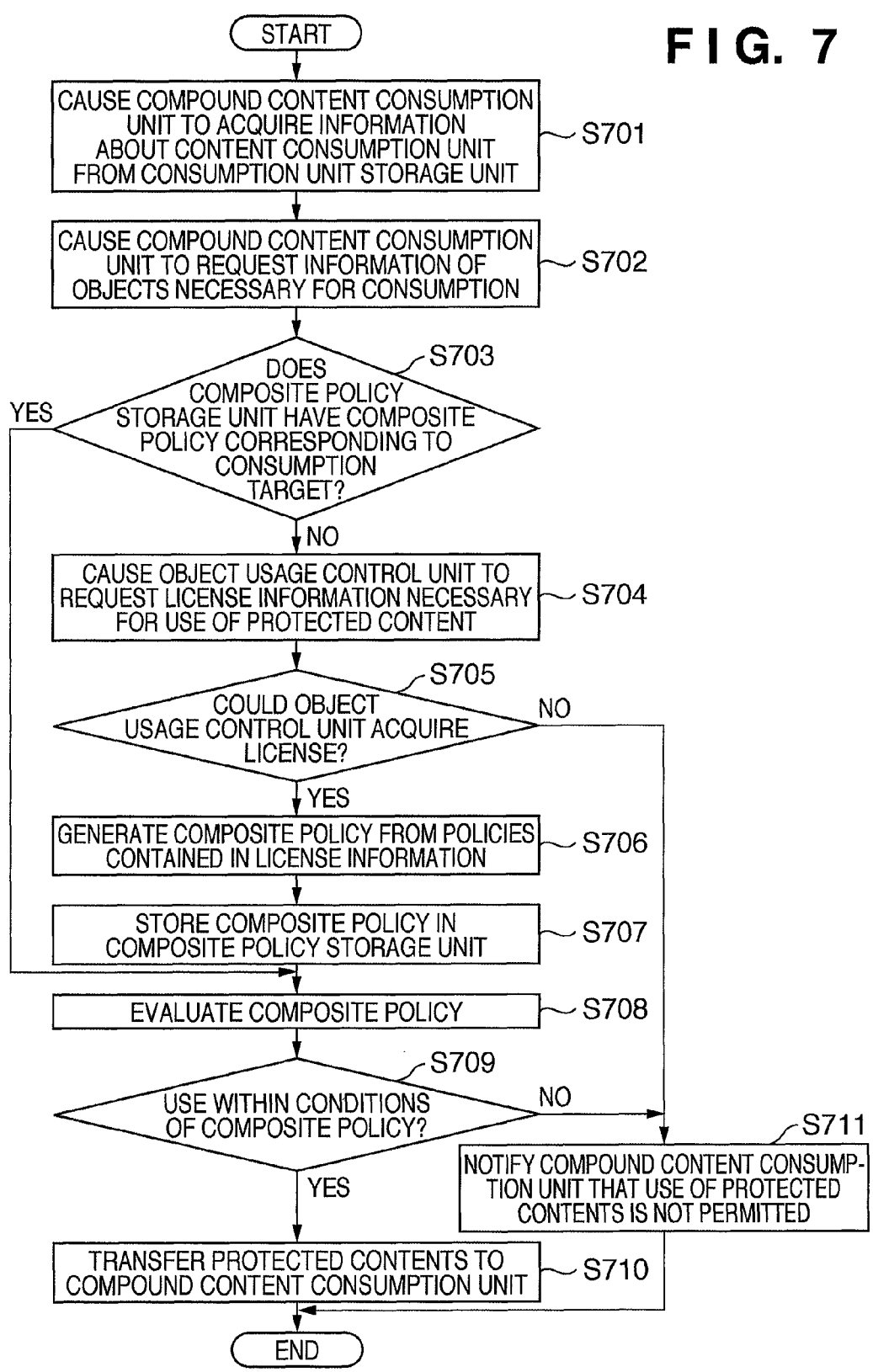
FIG. 7 is a flowchart illustrating a compound content consumption process according to the embodiment.

The compound content consumption process of the compound content consumption apparatus 103 will be described below with reference to the flowchart in FIG. 7.

First, the compound content consumption unit 605 acquires information about the content consumption unit from the consumption unit storage unit 609 (S701). Next, the compound content consumption unit 605 requests information about objects necessary for consuming a compound content of the object usage control unit 604 (S702). The compound content consumption unit 605 outputs a request to the object usage control unit 604 for each set of protected contents (content consumption unit) to be consumed. For example, to consume one page or document, the compound content consumption unit 605 requests all objects contained in the page or document simultaneously. For the compound content 212 shown in FIG. 2B, a set of protected contents to be consumed to output the pages described by the "Page" tags, or a set of protected contents to be consumed to output a page group described by the "PageSet" tags are requested simultaneously.

If the composite policy storage unit 606 stores no composite policy corresponding to the protected content set requested by the compound content consumption unit 605 (S703), the object usage control unit 604 requests license information of the protected content generation apparatus 101 (S704). More specifically, the object usage control unit 604 requests the license information of each protected content of the license output unit 404 in the protected content generation apparatus 101.

Upon acquiring the license information from the license output unit 404 (S705), the object usage control unit 604 generates a composite policy from the policies of protected contents contained in the license information for each requested object consumption unit (S706). The generated composite policy is stored in the composite policy storage unit 606 (S707).

After the composite policy is stored in the composite policy storage unit 606 in step S707, or if the composite policy storage unit 606 already stores the composite policy in step S703, the object usage control unit 604 evaluates the composite policy (S708). If the use is possible within the conditions of the policy as a result of policy evaluation (S709), the object usage control unit 604 returns the requested protected content set to the compound content consumption unit 605

(S710). On the other hand, if the use is not possible within the conditions of the policy as a result of policy evaluation (S709), the object usage control unit 604 notifies the compound content consumption unit 605 that the protected contents are not usable (S711).

If no license information is acquired from the license output unit 404 (S705), the object usage control unit 604 notifies the compound content consumption unit 605 that the protected contents are not usable (S711).

Figure 13:
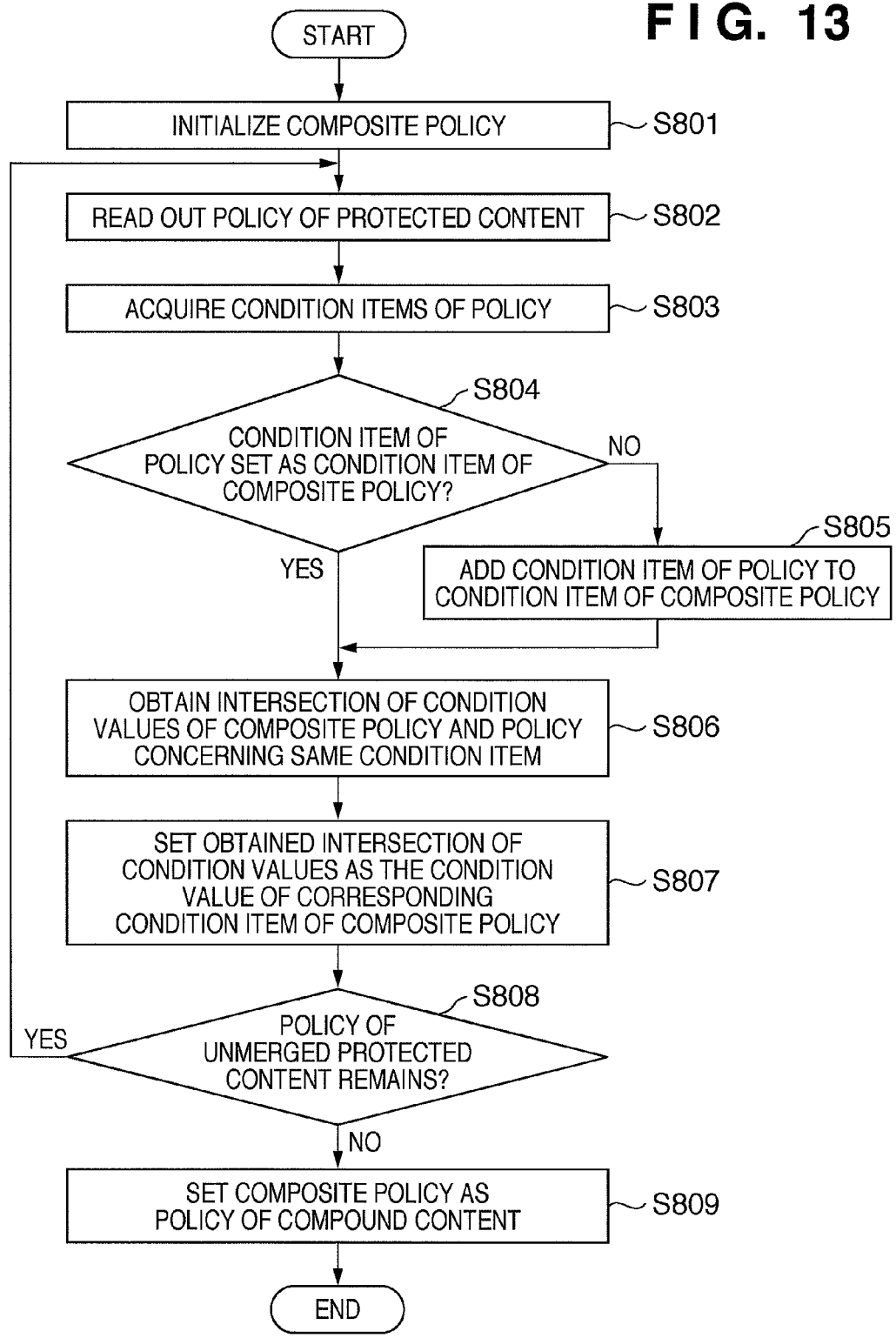
FIG. 13 is a flowchart illustrating the composite policy generation process according to the embodiment.

The composite policy generation process (S706) of the object usage control unit 604 will be described next with reference to the flowchart in FIG. 13.

The object usage control unit 604 initializes the composite policy (S801). Initialization indicates a process of setting, for example, a blank usage condition (the condition does not permit use). Next, the object usage control unit 604 reads out, from the compound license acquisition unit 608, a policy to be used to generate a composite policy (S802). The object usage control unit 604 acquires a condition item set for the policy read out in step S802 (S803). If the condition item is not set for the composite policy (S804), the object usage control unit 604 adds the condition item to those of the composite policy (S805). All condition items contained in the policy may be added to the composite policy in step S805. Alternatively, condition items predetermined by system setup or user designation may be added to the composite policy. Next, the object usage control unit 604 obtains the intersection of the condition values of a single condition item contained in the policy and the composite policy (S806) and sets the result as the condition value of the composite policy (S807). The object usage control unit 604 repeats the process in steps S802 to S807 for each readout policy (S808) to set a composite policy as the policy of the content group used to generate a compound content and saves the composite policy in the composite policy storage unit 606 (S809). The composite policy generation process may be executed stepwise. For example, a composite policy is generated first from the policies of protected contents within the range described by the "Page" tags, as shown in FIG. 2B. Next, a new composite policy may be generated from the composite policies of the "Page" tags within the range described by the "PageSet" tags.

A process of causing the protected content generation apparatus 101 to generate a composite policy according to this embodiment has been described above. In the example described in this embodiment, the compound content consumption unit 605 requests an object group of each consumption unit of the object usage control unit 604, and the object usage control unit 604 (implicitly) generates a composite policy for each consumption unit. However, the compound content consumption unit 605 can also request each object of the object usage control unit 604. In this case, the compound content consumption unit 605 notifies the object usage control unit 604 of the unit of composite policy generation (consumption unit), in addition to each object request. The object usage control unit 604 executes the composite policy generation process (S706) when all licenses of the consumption unit are acquired.

A process of causing the protected content generation apparatus 101 to generate protected contents and generating and consuming the compound content 212 shown in FIG. 2B according to this embodiment has been described above.

In the example described above, the composite policy generation process is executed at the time of compound content consumption. However, the composite policy generation process may be executed before compound content consumption. For example, the operator of the compound content consumption apparatus 103 which has received a compound content operates the compound content consumption apparatus 103, thereby executing the composite policy generation process in advance. When the compound content consumption apparatus 103 is requested to consume the compound content later, the composite policy generation process is not executed. Instead, usage of the compound content is controlled in accordance with the composite policy generated in advance.

As described above, according to this embodiment, for a set of protected contents whose usage is determined by evaluating a composite policy, the composite policy is evaluated once concerning the condition items used for the composite policy generation process. Hence, when a compound content is repeatedly consumed, the process amount can be reduced as compared to a case in which the policies of individual protected contents are evaluated.

In executing printing, whether to allow use of the protected contents in the document is determined by evaluating the policy of the compound content. Hence, the operator can early know whether the compound content is usable.

Second Embodiment

The second embodiment of the present invention will now be described. In the above-described first embodiment, the compound content consumption apparatus 103 generates a composite policy and consumes a compound content in accordance with the composite policy. In this case, upon receiving a compound content, the compound content consumption apparatus 103 must generate a composite policy from partial policies and evaluate the generated composite policy. For this reason, if composite policy generation takes a long time, the operator of the compound content consumption apparatus 103 waits until the end of the composite policy generation process and then knows whether the compound content is usable.

In the second embodiment, an example will be described in which different apparatuses execute composite policy generation and compound content consumption according to the composite policy to more quickly determine whether the compound content is usable.

The system arrangement according to the second embodiment is the same as that shown in FIG. 1 of the above-described first embodiment. More specifically, the system includes a protected content generation apparatus 101, compound content generation apparatus 102, and compound content consumption apparatus 103. The protected content generation apparatus 101 of the second embodiment has the same arrangement as in the above-described embodiment, and a description thereof will not be repeated. The internal arrangements and processes of the compound content generation apparatus 102 and the compound content consumption apparatus 103 will be described below.

Compound Content Generation Apparatus

The internal arrangement of the compound content generation apparatus 102 according to the second embodiment will be described with reference to FIG. 9. As described above, the compound content generation apparatus 102 of this embodiment is implemented by causing a host computer 315 shown in FIG. 3 to execute a compound content generation program. An example of the program is general document creation software.

Figure 9:
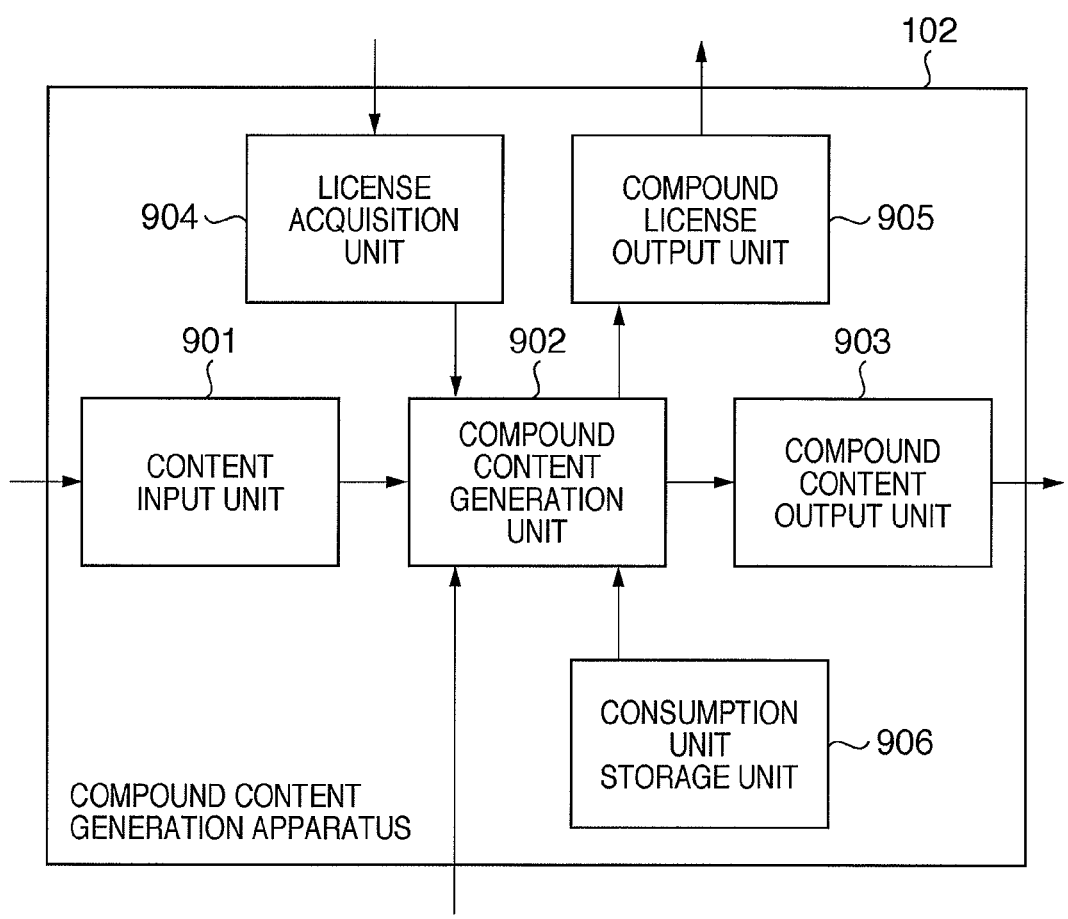
FIG. 9 is a block diagram showing the arrangement of a compound content generation apparatus according to the second embodiment.

As shown in FIG. 9, the compound content generation apparatus 102 of the second embodiment includes a license acquisition unit 904, compound license output unit 905, and consumption unit storage unit 906, in addition to a content input unit 901, compound content generation unit 902, and compound content output unit 903. The content input unit 901 and the compound content output unit 903 execute the same processes as those of the content input unit 501 and the compound content output unit 503 shown in FIG. 5 of the above-described first embodiment, and a description thereof will not be repeated.

The consumption unit storage unit 906 stores information about a consumption unit of an object group in a compound object, like the consumption unit storage unit 609 of the first embodiment. The operator arranges, using a mouse 311 or a keyboard 312, contents received by the content input unit 901 on pages so that the compound content generation unit 902 generates a compound content and a compound license. The generated compound license is output to the compound license output unit 905. The compound content is output to the compound content output unit 903. The compound license is data containing a key and a composite policy necessary for compound content consumption.

The license acquisition unit 904 acquires a license output from a license output unit 404 of the protected content generation apparatus 101 in accordance with a request from the compound content generation unit 902.

The compound license output unit 905 outputs the compound license information received from the compound content generation unit 902 in a form to ensure safe management. For example, the compound license is encrypted so that only a user or an apparatus that has acquired the compound license can decrypt it, or transmitted to an apparatus which safely manages the compound license. Alternatively, the compound license is written in an area of a DVD-R that is not read-accessible from a normal apparatus.

Compound Content Generation Process

A process of causing the compound content generation unit 902 to generate a compound content will be described below with reference to the flowchart in FIG. 11.

First, the compound content generation unit 902 acquires information about the object consumption unit from the consumption unit storage unit 906 (S1601). Next, the compound content generation unit 902 requests the licenses of protected contents necessary for generating a compound content of the license acquisition unit 904 (S1602). When the license acquisition unit 904 has acquired the necessary licenses (S1603), the compound content generation unit 902 decrypts each protected content using the decryption key contained in the license (S1604). The compound content generation unit 902 generates a composite policy from the policies contained in the licenses for each consumption unit acquired in step S1601 (S1605). The composite policy generation process is the same as that of the first embodiment described with reference to FIG. 13, and a description thereof will not be repeated.

Next, the compound content generation unit 902 generates an encryption key to encrypt each protected content contained in the compound license (S1606) and encrypts each protected content decrypted in step S1604 (S1607). The compound content generation unit 902 generates a compound license which describes the composite policy and a decryption key corresponding to the encryption key of the compound content and transfers the compound license to the compound license output unit 905 (S1608). Meta-information to acquire the compound license is added to the protected contents encrypted in step S1606 and/or the compound content.

If the license acquisition unit 904 could not acquire the necessary license (S1603), the compound content generation unit 902 stops compound content generation (S1609).

In the above-described example, each protected content is encrypted using a new encryption key. However, each encrypted protected content may directly be used for the compound content without decryption. In this case, the compound license describes a decryption key corresponding to each protected content and the composite policy.

Compound Content Consumption Apparatus

The internal arrangement of the compound content consumption apparatus 103 according to the second embodiment will now be described with reference to FIG. 10.

Figure 10:
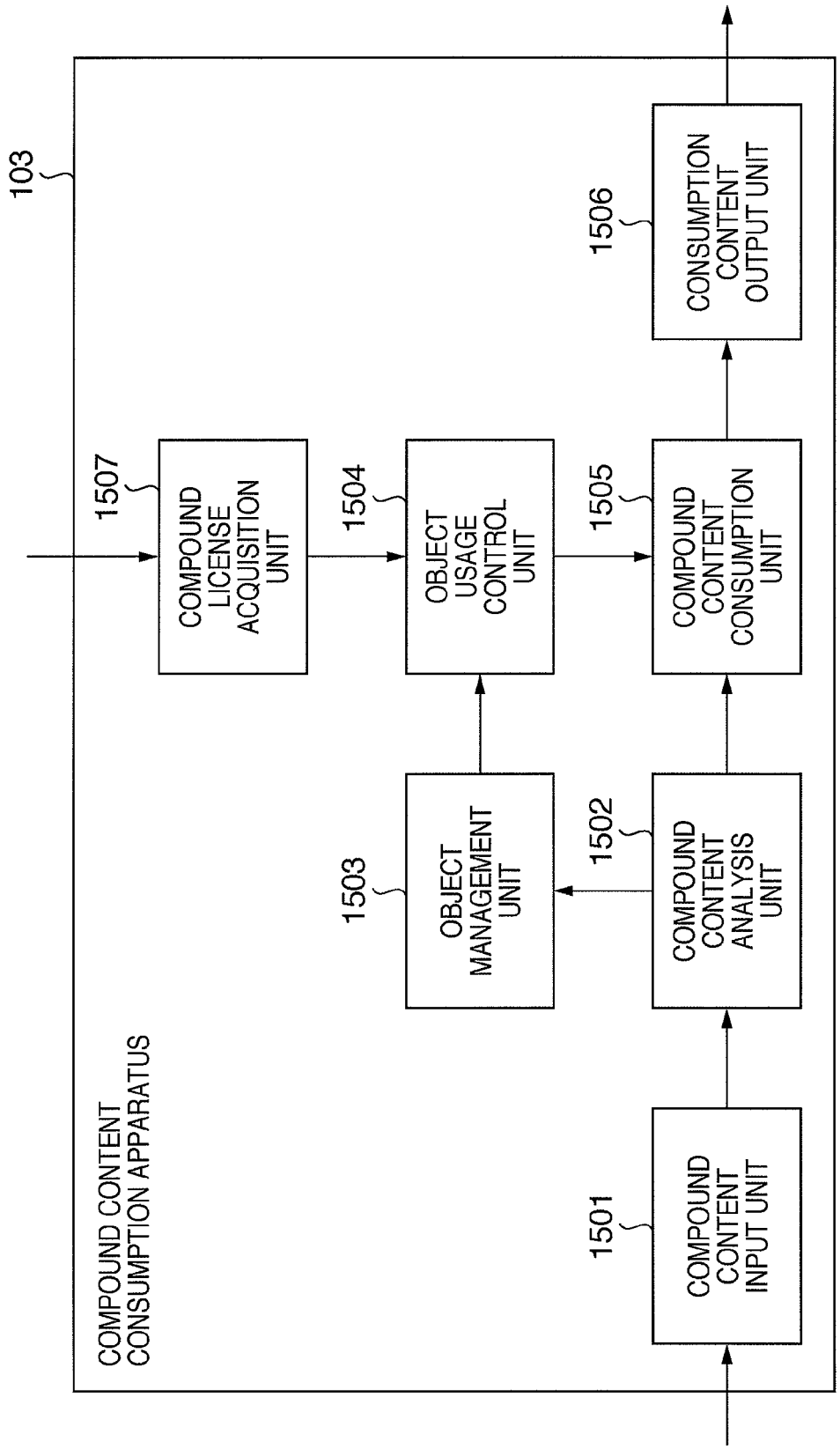
FIG. 10 is a block diagram showing the arrangement of a compound content consumption apparatus according to the second embodiment.

As shown in FIG. 10, the compound content consumption apparatus 103 of the second embodiment includes a compound content input unit 1501, compound content analysis unit 1502, object management unit 1503, object usage control unit 1504, and compound content consumption unit 1505. The compound content consumption apparatus 103 also includes a consumption content output unit 1506 and a compound license acquisition unit 1507. The compound content input unit 1501, compound content analysis unit 1502, and object management unit 1503 execute the same processes as those of the compound content input unit 601, compound content analysis unit 602, and object management unit 603 shown in FIG. 6 of the above-described first embodiment. The compound content consumption unit 1505 and the consumption content output unit 1506 also execute the same processes as those of the compound content consumption unit 605 and the consumption content output unit 607 shown in FIG. 6 of the above-described first embodiment. Hence, a description of these components will not be repeated.

The compound license acquisition unit 1507 acquires the compound license generated by the compound content generation apparatus 102 using the meta-information for compound license acquisition, which is described in the compound content and/or a protected content.

If an object received from the object management unit 1503 is a non-protected content, the object usage control unit 1504 returns the object in response to a request from the compound content consumption unit 1505. If the object is a protected content, the object usage control unit 1504 acquires the compound license output from the compound license output unit 905 and controls use of the protected content in accordance with the composite policy designated in the compound license. If no compound license is acquired for the compound license acquisition unit 1507, or use is not possible within the conditions of the composite policy, use of the compound content is stopped.

As described above, according to the second embodiment, since the composite policy generation process is executed in the compound content generation apparatus 102, the compound content consumption apparatus 103 does not execute the composite policy generation process. Hence, in the compound content consumption apparatus 103, whether a compound content is usable can be determined only by evaluating the composite policy once concerning the condition items used for the composite policy generation process.

Other Embodiments

The embodiments have been described above in detail. The present invention can take a form of a system, apparatus, method, program, or a recording medium (storage medium). More specifically, the present invention is applicable to a system including a plurality of devices (for example, host computer, interface device, image capturing apparatus, and web application) or an apparatus including a single device.

The object of the present invention is achieved even by supplying a software program for implementing the functions of the above-described embodiments to the system or apparatus directly or from a remote site and causing the computer of the system or apparatus to read out and execute the supplied program codes. In this case, the program is computer-readable and corresponds to the flowcharts illustrated in the embodiments.

Hence, the program code itself, which is installed in a computer to implement the functional processing of the present invention by the computer, also implements the present invention. That is, the present invention also incorporates the computer program itself for implementing the functional processing of the present invention.

In this case, the program can take any form such as an object code, a program to be executed by an interpreter, or script data to be supplied to the OS as long as the functions of the program can be obtained.

Examples of the recording medium to supply the program are a Floppy® disk, hard disk, optical disk, magnetooptical disk, MO, CD-ROM, CD-R, CD-RW, magnetic tape, nonvolatile memory card, ROM, and DVD (DVD-ROM or DVD-R).

As another program supply method, a client computer is connected to a homepage on the Internet by using a browser to download the computer program itself of the present invention (or a compressed file containing an automatic installation function) to a recording medium such as a hard disk. This can also be implemented by dividing the program codes contained in the program of the present invention into a plurality of files and downloading the files from different homepages. That is, a WWW server which causes a plurality of users to download the program file that causes a computer to implement the functional processing of the present invention is also incorporated in the present invention.

The program of the present invention may be encrypted, stored in a storage medium such as a CD-ROM, and distributed to users. Any user who satisfies predetermined conditions can download key information for decryption from a homepage via the Internet. That is, the user can execute the encrypted program using the key information and install the program in the computer.

The functions of the above-described embodiments are also implemented when the computer executes the readout program. The functions of the above-described embodiments are also implemented when, e.g., the OS running on the computer partially or wholly executes actual processing based on the instructions of the program.

The functions of the above-described embodiments are also implemented when the program read out from the recording medium is written in the memory of a function expansion board inserted into the computer or a function expansion unit connected to the computer and executed. More specifically, the CPU of the function expansion board or function expansion unit can partially or wholly execute actual processing based on the instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-156737 filed on Jun. 13, 2007 and 2008-144872 filed on Jun. 2, 2008, which are hereby incorporated by reference herein in their entirety.

What is claimed is:

1. An information processing system which includes a compound content generation apparatus and a compound content consumption apparatus and processes a plurality of protected contents,
the compound content generation apparatus comprising:
at least one processor configured to execute a computer-readable program recorded on a computer-readable recording medium, the program being executed to provide:
a compound content generation unit configured to generate a compound content from a plurality of protected contents, wherein a usage condition is set for each of the plurality of protected contents, and
the compound content consumption apparatus comprising:
at least one processor configured to execute a computer-readable program recorded on a computer-readable recording medium, the program being executed to provide:
a first determination unit configured to determine whether or not one usage condition for the plurality of protected contents is stored in a storage unit;
a composite usage condition generation unit configured to generate a composite usage condition by obtaining an intersection of condition values of the usage conditions set for the plurality of protected contents if the first determination unit determines that the usage condition is not stored;
a second determination unit configured to determine whether the compound content is usable by using the stored usage condition if the first determination unit determines that the usage condition is stored, and determine whether the compound content is usable by using the generated composite usage condition if the first determination unit determines that the usage condition is not stored; and
a compound content consumption unit configured to permit a consumption of the compound content based on a determination result by the second determination unit.

2. The system according to claim 1, wherein the compound content consumption apparatus further comprises an acquisition unit configured to acquire information about a consumption unit of the compound content, and
the composite usage condition generation unit generates the composite usage condition based on the information about the consumption unit and the usage conditions set for the plurality of protected contents.

3. The system according to claim 1, wherein the compound content generation unit generates the compound content containing the plurality of protected contents.

4. The system according to claim 1, wherein the usage condition set for each of the plurality of protected content has a condition item representing the usage condition of the protected content and a condition value of the condition item, and
the composite usage condition generation unit generates the composite usage condition which satisfies the condition items contained in the usage conditions set for the plurality of protected contents included in the compound content and the condition values of the condition items.

5. The system according to claim 4, wherein the composite usage condition generation unit obtains an intersection of condition values of a condition item common to the usage conditions set for the plurality of protected contents included in the compound content.

6. An information processing apparatus for processing a plurality of protected contents, comprising:
at least one processor configured to execute a computer-readable program recorded on a computer-readable recording medium, the program being executed to provide:

an acquisition unit configured to acquire a compound content generated from the plurality of protected contents, wherein a usage condition is set for each of the plurality of protected contents;

a first determination unit configured to determine whether or not one usage condition for the plurality of protected contents is stored in a storage unit;

a composite usage condition generation unit configured to generate a composite usage condition by obtaining an intersection of condition values of the usage conditions set for the plurality of protected contents if the first determination unit determines that the usage condition is not stored;

a second determination unit configured to determine whether the compound content is usable by using the stored usage condition if the first determination unit determines that the usage condition is stored, and determine whether the compound content is usable by using the generated composite usage condition if the first determination unit determines that the usage condition is not stored; and a compound content consumption unit configured to permit a consumption of the compound content based on a determination result by the second determination unit.

7. An information processing method of processing a plurality of protected contents, the method comprising using at least one processor to perform the steps of:

an acquiring step of acquiring a compound content generated from the plurality of protected contents, wherein a usage condition is set for each of the plurality of protected contents;

a first determination step of determining whether or not one usage condition for the plurality of protected contents is stored in a storage unit;

a composite usage generation step of generating a composite usage condition by obtaining an intersection of condition values of the usage conditions set for the plurality of protected contents if the first determination step determines that the usage condition is not stored;

a second determination step of determining whether the compound content is usable by using the stored usage condition if the first determination step determines that the usage condition is stored, and determining whether the compound content is usable by using the generated composite usage condition if the first determination step determines that the usage condition is not stored; and a compound content consumption step of permitting a consumption of the compound content based on a determination result by the second determination step.

8. A non-transitory computer-readable recording medium recording a computer program which is executed on a computer to cause the computer to function as an information processing apparatus of claim 6.

* * * * *